United States Patent [19]

Bott

[11] 4,433,804
[45] Feb. 28, 1984

[54] VEHICLE ARTICLE CARRIER

[76] Inventor: John A. Bott, 931 Lakeshore Dr., Grosse Point, Mich. 48236

[21] Appl. No.: 335,698

[22] Filed: Dec. 30, 1981

[51] Int. Cl.³ .............................................. B60R 9/04
[52] U.S. Cl. ..................... 224/321; 224/328
[58] Field of Search .............. 224/321, 325, 328, 327, 224/326, 319, 316, 309; 296/100, 102, 120 A, 3, 296/95

[56] References Cited

U.S. PATENT DOCUMENTS

| 3,095,129 | 6/1963 | Kerr | 224/328 |
|---|---|---|---|
| 3,102,708 | 9/1963 | Crain | 248/361 |
| 3,366,295 | 1/1968 | Nygaard | 224/325 |
| 3,861,572 | 1/1975 | Norris et al. | 224/328 |
| 3,907,184 | 9/1975 | Zane et al. | |
| 3,955,732 | 5/1976 | Boschen | 296/100 |
| 4,015,760 | 4/1977 | Bott | 224/42.1 D |
| 4,089,735 | 4/1978 | Kappas | 224/328 |
| 4,099,658 | 7/1978 | Bott | 224/42.1 F |
| 4,103,810 | 8/1978 | Hickey | 224/328 |
| 4,132,335 | 1/1979 | Ingram | 224/42.1 F |
| 4,162,755 | 7/1979 | Bott | 224/326 |
| 4,239,139 | 12/1980 | Bott | 224/324 |
| 4,264,025 | 4/1981 | Ferguson | 224/321 |
| 4,274,568 | 6/1981 | Bott | 224/319 |
| 4,277,009 | 7/1981 | Bott | 224/321 |
| 4,345,706 | 8/1982 | Benit | 224/328 |
| 4,358,037 | 11/1982 | Heideman | 224/325 |

FOREIGN PATENT DOCUMENTS

| 1089420 | 11/1980 | Canada | 224/328 |
|---|---|---|---|
| 2467738 | 10/1979 | France | 224/319 |

Primary Examiner—Allan N. Shoap
Assistant Examiner—Robert Petrik
Attorney, Agent, or Firm—Harness, Dickey & Pierce

[57] ABSTRACT

An enclosure mountable upon and cooperable with an article carrier having adjustable and/or removeable means for securing articles to said carrier wherein the enclosure may protect articles on the article carrier from damage from adverse weather conditions or debris thrown against the enclosure, such as from a passing vehicle. Support and securement devices may be located within the enclosure which comprise removeable and/or adjustable components of a luggage carrier system optimizing securement tie down points and offering a tremendous degree of flexibility as an article carrier, along with permitting a number of accessories to be mounted to the luggage carrier with or without the enclosure.

9 Claims, 6 Drawing Figures

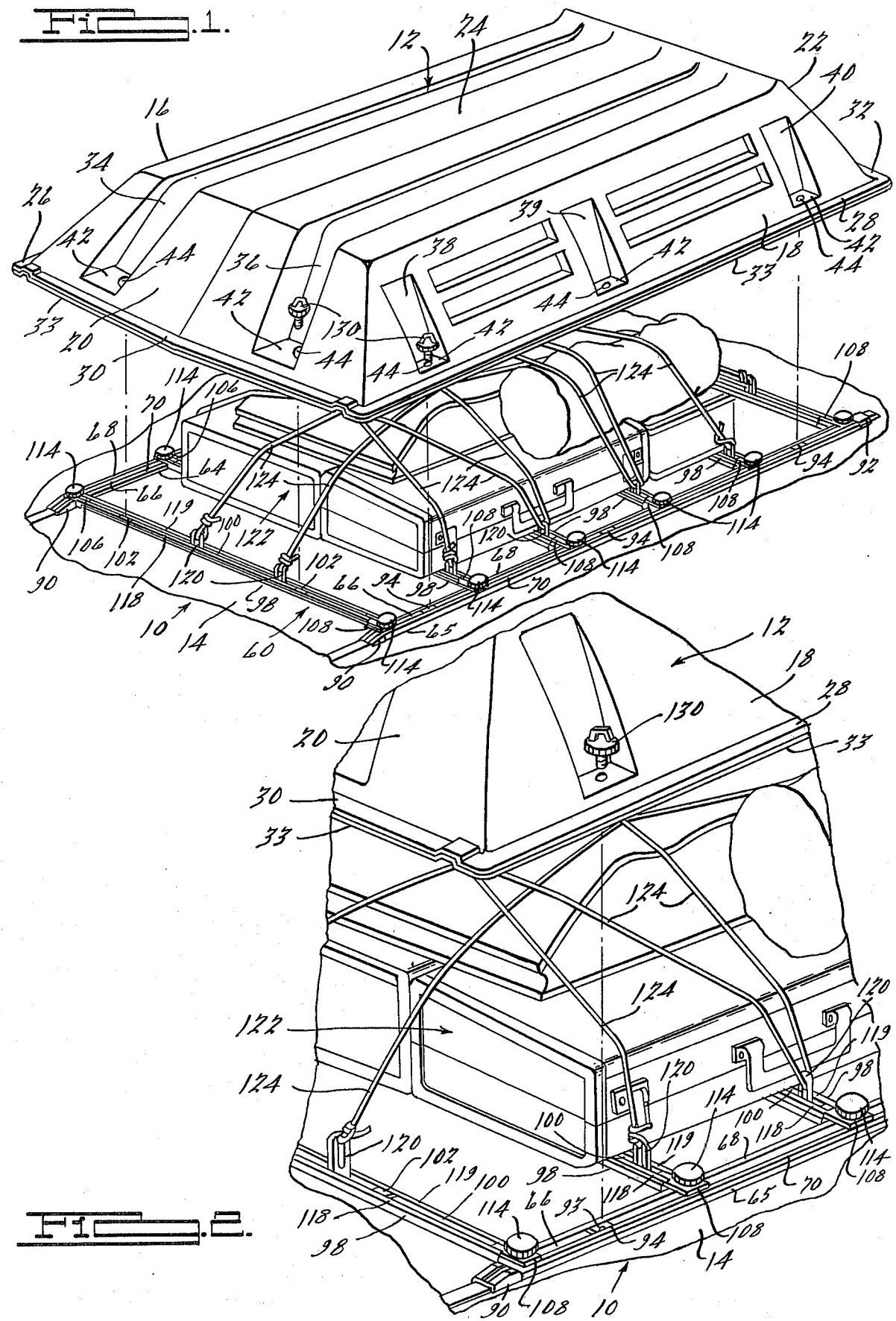

VEHICLE ARTICLE CARRIER

BACKGROUND AND SUMMARY OF THE INVENTION

This invention relates generally to auxiliary cargo carriers adapted to be mounted on automotive vehicles, and more specifically to such auxiliary cargo carriers as provide a protective enclosure which is adapted to be easily and removably installed upon a motor vehicle.

Often it is desirable to provide additional cargo carrying capacity for automotive vehicles, particularly for the newer compact models which have greatly reduced cargo carrying capacity. Accordingly, various devices have been developed which are adapted to be mounted on exterior surfaces of the vehicle such as a roof or trunk lid which provide a means for securing additional cargo to these exterior portions of the vehicle.

Conventional article or luggage carriers commonly provided on automobiles or similar vehicles offer one means of providing this necessary and desirable additional cargo carrying capacity. A wide assortment of such luggage carriers are commonly available today, and generally are adapted to be mounted either on the roof of vehicles, such as station wagons, sedans, or the like, or on the trunk lid of the vehicles. Generally, these luggage carriers provide at least a partial perimeter rail for retaining the cargo within an enclosed area and a plurality of support members which may be attached to the rail or secured directly to the vehicle. These carriers may be designed for either permanent installation, such as those commonly provided on station wagons, or may be adapted to be removable during periods of non-use. In using any of these carriers, an individual will generally secure the cargo to the carrier by tying it in place with rope or other suitable elongated containment device. While these carriers are suitable for accommodating various sizes and shapes of articles, the cargo carried thereby is exposed to potential damage from adverse weather conditions which may be encountered, as well as potential damage from debris which may be thrown against the cargo by other vehicles. Also, some of these carriers are difficult to use in particular for carrying small articles, since several layers of rope or the like must be wrapped around, over, and under the articles and carrier in order to secure the articles to the carrier and prevent them from being dislodged by the forces exerted thereon such as by wind resistance and/or maneuvering of the vehicle. Slideably adjustable luggage carriers have optimized tie down points to minimize the amount of rope or the like needed for securement, but still expose the secured articles to the elements of the environment.

More recently, various types of bags have been developed for use in conjunction with luggage carriers. The bags are generally fabricated from a flexible rubberized canvas or plastic composition and may be provided with a zipper to allow various articles to be easily inserted into the bag. The bag may then be tied as a single unitary package to the luggage carrier itself. While the use of the bag does offer some protection against the elements encountered by the motor vehicle these bags may be easily torn or otherwise damaged to allow rain or dirt to enter and possibly damage the contents thereof.

Other types of enclosures have also been developed which are adapted to be mounted on the vehicle. Generally all of these other various enclosures, however, utilize exterior means for securing the enclosure to the vehicle itself and are not integrated into a removable and adjustable luggage carrier system having support means and removeable and/or adjustable securement means for articles secured within the enclosure at optimized tie down points. Further, prior art enclosures are generally difficult to mount and remove, thus making them less desirable to use by the individual.

Accordingly, the present invention provides an enclosure which has means provided thereon for cooperating with mounting means either permanently or removably secured to the vehicle itself which allow the enclosure to be easily and removably secured to the vehicle. Further, support and securement means are located within the enclosure which comprise removeable and/or adjustable components of a luggage carrier system optimizing securement tie down points and offering a tremendous degree of flexibility as a luggage carrier in itself, along with permitting various accessories to be mounted to the luggage carrier with or without the enclosure. Also, the enclosure is fabricated from relatively rigid self-supporting materials so as to protect the contents from damage from adverse weather conditions or debris thrown against the enclosure, such as from a passing vehicle.

Other features and advantages of the present invention will become apparent from the subsequent description and the appended claims taken in conjunction with the accompanying drawings.

BRIEF DESCRIPTION OF THE DRAWINGS

FIG. 1 is an exploded perspective view of an automobile having an enclosure in accordance with the present invention mounted thereon;

FIG. 2 is an exploded perspective view of a portion of the enclosure partially broken away and illustrating a means for securing the enclosure to a vehicle;

FIG. 3 is a sectional view of a portion of the enclosure shown in operative and assembled relationship to the mounting means of FIG. 2;

FIG. 4 is a perspective view of an alternative embodiment of the present invention utilizing elevated cross rails;

FIG. 5 is an exploded perspective view similar to FIG. 2 of an alternative embodiment of the securing means of FIG. 2; and FIG. 6 is a view similar to FIG. 5 illustrating the securing means prior to assembly.

DETAILED DESCRIPTION OF THE PREFERRED EMBODIMENTS

Referring now to FIG. 1, a motor vehicle indicated generally at 10 is illustrated having an enclosure 12 in accordance with the present invention mounted on a portion of a horizontally extending body surface 14. Enclosure 12 is generally rectangular in shape and of a size to cover a substantial portion of the surface 14. The enclosure 12, however, may be of any desired size and shape. While it may be fabricated from any suitable material, the design is particularly well suited for farication from a plastic composition used in a vacuum forming operation. A particularly well suited material for this purpose is a polyethylene composition. The enclosure 12 comprises a box-like structure having sidewalls 16 and 18, front wall 20, rear wall 22, and top wall 24. The sidewalls, front wall, and rear wall each have an outwardly extending flange portions 26, 28, 30, or 32, respectively, integrally extending from the base of the respective wall. Padding 33 is disposed on the lower surface of each of the flange portions 26, 28, 30, and 32 to keep the enclosure 12 from marring the vehicle surface 14. The relationship between the front wall and a top wall presents a much lower profile than the relationship between the top wall and the rear wall (i.e., the rear wall 22 meets the top wall 24 at a greater distance from the vehicle surface 14 than the pont at which the front wall 20 meets the top wall 24), so as to provide an aerodynamic effect or wedge shape to the enclosure 12 when it is mounted on a vehicle. A series of recesses 34, 36, 38, 39, and 40 are also included in each of the sidewalls and the front and rear walls, respectively. Each recess 34, 36, 38, 39 and 40 has a horizontally disposed flat portion 42 with an aperture 44 disposed therein.

Figures 3, 4, 5, 6:
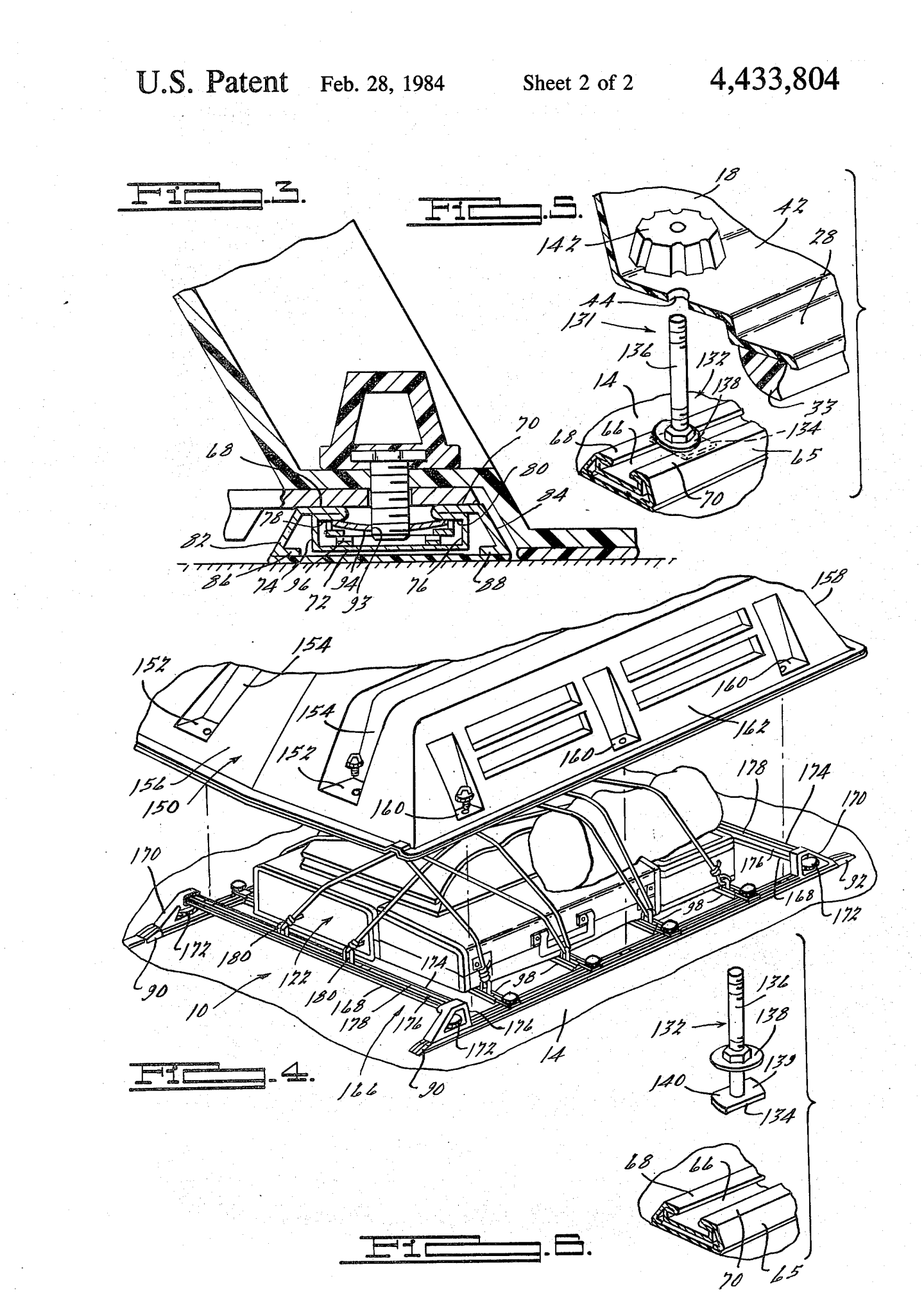

As best illustrated in FIGS. 1 and 4, the enclosure 12 is adapted to be securely mounted to an adjustable and removable luggage carrier 60 or 166 secured to a horizontal 14 portion of a vehicle 10 to which the enclosure 12 is to be mounted. The luggage carrier 60 includes, with reference to FIG. 1, elongated slats 64 and 65 securely mounted to the horizontal portion 14 of the vehicle 10 in any suitable manner such as by screw fasteners or the like. Each of these slats 64, 65 may be substantially identical to and are described in applicant's U.S. Pat. Nos. 4,099,658, issued to applicant on July 11, 1978, 4,015,760, issued to applicant on April 5, 1977, and 4,182,471, issued to applicant on Jan. 8, 1980, or of a similar alternative construction. Each slat 64, 65 essentially comprises a slot or channel 66 formed by the interior surfaces of the slat 64 or 65, and two longitudinally extending support surfaces 68 and 70 disposed adjacent the upper opening of the channel 66. Referring to FIG. 3, the channel 66 is formed by a base member 72, two vertically upwardly extending sidewalls 74 and 76, and two inwardly extending upper clamping surfaces 78 and 80. The slats 64, 65 also include outer walls 82 and 84 and inwardly extending flanges 86 and 88, along with end caps 90 and 92 conformably fitting one on each end of the slats 64, 65. Sliding fastener means or clamping members 94, having threaded apertures 93, and retainer members 96 are slidably disposed within the channels 66 of the slats 64, 65.

Between the two slats 64 and 65 are disposed a plurality of cross members 98 which also include channels 100, and may have clamping members 102, having threaded apertures, and retainer members in the same manner as described above within the slats. The ends of the cross members 98 have support members 106 and 108 telescopically disposed at each end with apertures through which a manually engageable rotatable wheel 114 having a threaded stud extending therefrom passes through said aperture into the threaded aperture 93 of one of the clamping members 94 in the slats 64 or 65 to operably and clampingly engage the cross member 98 to the slats 64 and 65. The cross member 98 also has longitudinally extending support surfaces 118 and 119 adjacent the channel 100. Tie down members 120 are disposed at various locations along the slats 64, 65 and cross members 98 as needed. The tie down members may be those substantially described in applicant's U.S. Pat. No. 4,239,139, issued to applicant on Dec. 16, 1980, or any of a variety of alternative types of tie down members which are capable of slideable adjustment along the slat or cross member and clamping engagement with the slat or cross member to optimize tie down points for any article or combination of articles to be carried.

Luggage or other articles 112 are disposed on the support surfaces 68, 70 and/or 118, 119 of the slats or the cross members, respectively. Rope or similar material 124 is extended across the luggage or other articles 122 and operably associated with the tie down members 120 on either the slats 64, 65 or the cross members 98.

The enclosure 12 is positioned over the luggage 122 and additional tie down members 130 are disposed in the apertures 44 of the flat sections 42 of the recesses 34, 36, 38, 39, or 40 in the front 20, rear 22 and side 16, 18 walls of the enclosure 12. The tie down members 130 engage the threaded apertures of clamping members 94 or 102, respectively, in the slats or cross members to secure the enclosure 12 to the luggage carrier and to the vehicle.

Prior to securing the enclosure 12 in position over the luggage, the clamping members 94 or 102 must be positioned to properly associate the centerlines of the apertures of the clamping member 94 or 102 on the same centerlines as the centerlines of the respective apertures 44 of the enclosure 12. The clamping members 94 or 102 may be positioned by placing the enclosure 12 on the luggage carrier and aligning the centerlines of the apertures individually around the enclosure 12. In an alternative method, marks are disposed on the slats and cross members to locate the clamping members in proper positions on the slats and cross members prior to disposition of the enclosure 12 over the luggage.

An alternative embodiment of the enclosure securing mechanism 131 is illustrted in FIGS. 5 and 6. A clamping member 132 is illustrated having a base portion 134 from which a threaded stud 136 extends. The base portion 134 is constructed to have a width less than the dimension between the upper support surfaces of the slat or cross member forming the opening to the channel to be disposeable into and removeable from the channel through that opening. Once within the channel, the base portion 134 is rotated ninety degrees to its operative clamping position wherein the length of the base portion 134 is of a greater dimension than its width to keep the base portion 134 from being removable from the channel when in its operative position. A clamping nut 138 is threadably disposed on the stud 136. As illustrated in FIG. 5, the base portion 134 is disposed in the channel of a slat or cross member with the base portion 134 having clamping surfaces 139, 140 which clampingly engage the clamping surfaces of the channel when the nut 138 is threadably moved to a position substantially as shown in FIG. 5. The enclosure 12 is then placed onto the vehicle with its apertures 44 each aligned over one of a plurality of the threaded studs 136. Manually engageable threaded wheels 142 are then threaded onto the studs 136 above the enclosure 12 to secure the enclosure 12 to the luggage carrier and the vehicle.

Referring to FIG. 4, an alternative embodiment of the enclosure 150 is illustrated wherein the flats 152 in the recesses 154 of the front 156 and rear 158 walls are horizontally disposed at a higher elevation than the horizontal flats 160 in the recesses of the sidewalls 162. The luggage carrier 166 illustrated in FIG. 4 has cross members comprising vertically elevated cross rails 168 telescopically engaging stanchions 170 which include manually engageable clamping means 172 operably associated with a clamping element in the slats 64, 65. The cross rail 168 includes support surfaces 174, 176 and a longitudinally extending channel 178 similar to that described above with regard to either the slats 64, 65 or the cross members 98. Tie down elements 180 are operably disposed with clamping elements in the channel 178 of the cross rail 168, which tie down elements 180 again may be selected from any of a number of possibilities being capable of slideable adjustment along the length of the cross rail 168 and clampingly engageable to optimize tie down points for the article or combination of articles carried on the carrier 166. The enclosure 150 fits over the luggage or articles 122 in a similar manner as that illustrated in FIG. 1 except that the tie down elements 180 are operably engaged with the outside slats 64, 65 and the elevated cross rails 168. The enclosure securing mechanism 131 of FIGS. 5 and 6 may also be used with the above described embodiment illustrated in FIG. 4.

While it will be apparent that the preferred embodiments of the invention disclosed herein provide an extremely convenient safe means of increasing the cargo carrying capacity of the vehicle, it will be appreciated that the invention is subject to modification, variation and change without departing from the proper scope or fair meaning of the subjoined claims.

I claim:

1. An article carrier adapted to be secured to a generally horizontally extending exterior body surface of a motor vehicle, comprising:
    at least two elongated spaced parallel support members fixedly secured directly upon said surface of said vehicle and having a low profile against said surface;
    at least two elongated spaced parallel cross members adjustably and removably secured to said support members;
    each of said support members and said cross members being of greaer width than height in transverse cross section, with said width extending parallel to said body surface;
    said support membrs and cross members having upper article supporting surfaces and longitudinally extending upwardly opening channels, with said supporting surrfaces on the upper sides of said support members and cross members, and clamping surfaces extending longitudinally within the interior of said channels interior to said support members and cross members;
    sliding fastener means disposed within said channels clampingly engageable with the clamping surfaces of said channelled support members and cross members, and being slidably adjustably moveable longitudinally in said support members and cross members for repositioning within said respective support member or cross member or on another of said channelled support members or cross members when not clampingly engaged with said clamping surface;
    manually engageable means for clampingly engaging said fastener means to said support members or cross members, secured to said sliding fastener means and operably engaging an elongated threaded element projecting into said channel and projecting above said supporting surfaces; article retaining means comprising an enclosure mounted directly upon said article supporting surfaces, said enclosure comprising a front wall, a rear wall, two side walls and a top wall and including exteriorly exposed horizontal portions disposed at least at one of said side, front or back walls of said enclosure and said enclosure including means for disposing said horizontal portions of said enclosure between at least a portion of said manually engageable means and said sliding fastener means, wherein said enclosure is secured to at least one of said support members or cross members by the clamping engagement of said sliding fastener means with at least one of said support members or cross members by said manually engageable means.

2. An article carrier in accordance with claim 1, wherein said rear wall is connected to said top wall at a greater distance from said vehicle surface than the point at which said front wall is connected to said top wall when said enclosure is mounted on said slats and cross members.

3. An article carrier adapted to be secured to a generally horizontally extending exterior body surface of a motor vehicle, comprising:
    at least two elongated spaced parallel slats fixedly secured directly upon said surface of said vehicle and having a low profile against said surface;
    at least two elongated spaced parallel cross members adjustably and removeably secured to said slats;
    each of said slats and said cross members being of greater width than height in transverse cross section, with said width extending parallel to said body surface;
    said slats and cross members having upper article supporting surfaces and longitudinally extending channels, with said supporting surfaces on the upper sides of said slats, and clamping surfaces extending longitudinally coextensive with said channels interior to said slats;
    sliding fastener means disposed within said channels clampingly engageable with the clamping surfaces of said channelled slats, and being slidably adjustably moveable longitudinally in said slats for repositioning within said slat or on another of said channelled slats when not clampingly engaged with said clamping surfaces;
    manually engageable means clampingly engaging said fastener means to said slats, secured to said sliding fastener means and operably engaging an elongated threaded element;
    article retaining means comprising an enclosure mounted directly upon said article supporting surfaces, said enclosure having two side walls and including means for disposing said enclosure between at least a portion of said manually engageable means and said sliding fastener means, wherein said enclosure is secured to said slats by the clamping engagement of said sliding fastener means with said slats by said manually engageable means, said sidewalls of said enclosure including exteriorly exposed horizontally disposed flat portions, which flat portions are disposed between said manually engageable means and said sliding fastener means when said enclosure is secured to said slats.

4. An article carrier in accordance with claim 3, wherein said sidewalls include recesses, and said flat portions are disposed in said recesses in said sidewalls.

5. An article carrier adapted to be secured to a generally horizontally extending exterior body surface of a motor vehicle, comprising:
    at least two elongated spaced parallel slats fixedly secured directly upon said surface of said vehicle and having a low profile against said surface;

at least two elongated spaced parallel cross members adjustably and removably secured to said slats;

each of said slats and said cross members being of greater width than height in transverse cross section, with said width extending parallel to said body surface;

said slats and cross members having upper article supporting surfaces and longitudinally extending channels, with said supporting surfaces on the upper sides of said slats, and clamping surfaces extending longitudinally coextensive with said channels interior to said slats;

sliding fastener means disposed within said channels clampingly engageable with the clamping surfaces of said channelled slats and cross members, and being slidably adjustably moveable longitudinally in said slats and cross members for repositioning within said slat or cross member or on another of said channelled slats or cross members when not clampingly engaged with said clamping surfaces;

manually engageable means for clampingly engaging said fastener means to said slats or cross members, secured to said sliding fastener means and operably engaging an elongated threaded element;

article retaining means comprising an enclosure mounted directly upon said article supporting surfaces, said enclosure having a front wall and a rear wall and including means for disposing said enclosure between at least a portion of said manually engageable means and said sliding fastener means, wherein said enclosure is secured to said slats and cross members by the clamping engagement of said sliding fastener means with said slats and cross members by said manually engageable means, said front wall and said rear wall of said enclosure each including exteriorly exposed horizontally disposed flat portions, which flat portions are disposed between said manually engageable means and said sliding fastener means when said enclosure is secured to said cross members.

6. An article carrier in accordance with claim 5, wherein said front wall and said rear wall include recesses, and said flat portions are disposed in said recesses.

7. An article carrier adapted to be secured to a generally horizontally extending exterior body surface of a motor vehicle, comprising:

at least two elongated spaced parallel support members fixedly secured directly upon said surface of said vehicle and having a low profile against said surface;

at least two elongated spaced parallel cross members adjustably and removeably secured to said slats;

each of said support members and said cross members being of greater width than height in transverse cross seaction, with said width extending parallel to said body surface;

said support members and cross members having upper article supporting surfaces and longitudinally extending channels, with said supporting surface on the upper sides of said support members and cross members, and clamping surfaces extending longitudinally coextensive with said channels;

sliding fastener means disposed within said channels clampingly engageable with the clamping surfaces of said channelled support members and cross members, and being slidably adjustably moveable longitudinally in said support members and cross members for repositioning within said support member or cross member or on another of said channelled support members or cross members when not clampingly engaged with said clamping surfaces;

manually engageable means for clampingly engaging said fastener means to said support members or cross members, secureable to said sliding fastener means and operably engaging an elongated threaded element;

article retaining means comprising an enclosure mounted directly upon said article supporting surfaces, said enclosure having two side walls and including means for disposing said enclosure between at least a portion of said manually engageable means and said sliding fastener means, wherein said enclosure is secured to said support members and cross members by the clamping engagement of said sliding fastener means with said support members and cross members by said manually engageable means, and each of said sidewalls has a flange portion extending outwardly from the edge of each said sidewall adjacent said vehicle surface when said enclosure is mounted on said support members, and padding means disposed on the surface of said flange portion facing said vehicle surface when said enclosure is mounted on said support members.

8. An article carrier adapted to be secured to a generally horizontally extending exterior body surface of a motor vehicle, comprising:

at least two elongated spaced parallel support members fixedly secured directly upon said surface of said vehicle and having a low profile against said surface;

at least two elongated spaced parallel cross members adjustably and removeably secured to said support members;

each of said support members and said cross members being of greater width than height in transverse cross section, with said width extending parallel to said body surface;

said support members and cross members having upper article supporting surfaces and longitudinally extending channels, with said supporting surfaces on the upper sides of said slats, and clamping surfaces extending longitudinally coextensive with said channels;

sliding fastener means disposed within said channels clampingly engageable with the clamping surfaces of said channelled support members and cross members, and being slidably adjustably moveable longitudinally in said support members and cross members for repositioning within said support members or cross member or on another of said channelled support members or cross members when not clampingly engaged with said clamping surfaces;

manually engageable means for clampingly engaging said fastener means to said support members or cross members, secureable to said sliding fastener means and operably engaging an elongated threaded element;

article retaining means comprising an enclosure having front, back and side elements and interior and exterior surfaces, mounted directly upon said article supporting surfaces and having horizontally disposed attachment portions at an exterior surface of said enclosure, said enclosure including means for disposing said attachment portions of said enclosure between at least a portion of said manually engageable means and said sliding fastener means, wherein said enclosure is secured to said support members and cross members by the clamping engagement of said sliding fastener means with said support members and cross members by said manually engageable means.

9. An article carrier adapted to be secured to a generally horizontally extending exterior body surface of a motor vehicle, comprising:
 a plurality of elongated support members each adapted to be individually fixedly secured directly to said portion of said motor vehicle in spaced substantially parallel relationship,
 at least one of said support members having a longitudinally extending upwardly opening channel, including clamping surfaces within the interior of said channel,
 a fastener means disposed within said channel,
 elongated means projecting into said channel into engagement with said fastener means and projecting above said supporting surfaces,
 manually engageable means for clampingly engaging said fastener means operably engaged with said elongated means, and
 article securing means comprising an enclosure having exterior surfaces and interior surfaces, and having horizontally disposed exterior surface portions, said enclosure being supported directly on said one slat, said elongated means being capable of extending through the horizontally disposed exterior surface portions of said enclosure, and said manually engageable means disposed exterior of at least a portion of one of said horizontally disposed exterior surface portions of said enclosure, including means cooperable with said elongated means and operative to cause said enclosure to be clampingly secured to said support member.

* * * * *

UNITED STATES PATENT AND TRADEMARK OFFICE
CERTIFICATE OF CORRECTION

PATENT NO. : 4,433,804
DATED : February 18, 1984
INVENTOR(S) : John A. Bott

It is certified that error appears in the above-identified patent and that said Letters Patent is hereby corrected as shown below:

On the title page:

In "References Cited", Pat. No. 3,907,184 to Zane, et al.
  Add --224--.

In "References Cited", Pat. No. 4,049,735 to Kappas
  "4,089,735" should read --4,084,735--.

Column 2, line 61, "farication" should read --fabrication--.

Column 4, line 32, "illustrted" should read --illustrated--.

Column 5, line 37, "greaer" should read --greater--.

Column 5, line 40, "membrs" should read --members--.

Column 5, line 43, "surrfaces" should read --surfaces--.

Column 6, line 42, after "means" should read --for--.

Column 7, line 55, "seaction" should read --section--.

Column 7, line 60, "surface" should read --surfaces--.

Column 9, line 20, delete "a".

Signed and Sealed this

Thirteenth Day of November 1984

[SEAL]

Attest:

Attesting Officer

GERALD J. MOSSINGHOFF

Commissioner of Patents and Trademarks